(12) United States Patent
Kimba Dit Adamou

(10) Patent No.: US 11,825,318 B2
(45) Date of Patent: *Nov. 21, 2023

(54) BACKHAUL PATH SWITCHING METHOD, WIRELESS RELAY, NETWORK-SIDE NODE AND TERMINAL

(71) Applicant: VIVO MOBILE COMMUNICATION CO., LTD., Guangdong (CN)

(72) Inventor: Boubacar Kimba Dit Adamou, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/885,768

(22) Filed: Aug. 11, 2022

(65) Prior Publication Data

US 2022/0394517 A1   Dec. 8, 2022

Related U.S. Application Data

(63) Continuation of application No. 16/970,314, filed as application No. PCT/CN2019/073673 on Jan. 29, 2019, now Pat. No. 11,451,985.

(30) Foreign Application Priority Data

Feb. 14, 2018   (CN) .......................... 201810152153.6

(51) Int. Cl.
*H04W 24/04* (2009.01)
*H04W 76/15* (2018.01)
*H04W 40/12* (2009.01)
*H04W 40/22* (2009.01)

(52) U.S. Cl.
CPC .......... *H04W 24/04* (2013.01); *H04W 40/12* (2013.01); *H04W 40/22* (2013.01); *H04W 76/15* (2018.02)

(58) Field of Classification Search
None
See application file for complete search history.

(56) References Cited

U.S. PATENT DOCUMENTS

| | | | |
|---|---|---|---|
| 8,385,921 | B1 | 2/2013 | Shousterman et al. |
| 11,451,985 | B2 * | 9/2022 | Kimba Dit Adamou ..................... H04W 40/22 |
| 2005/0107085 | A1 | 5/2005 | Ozluturk |

(Continued)

FOREIGN PATENT DOCUMENTS

| | | |
|---|---|---|
| CN | 102843716 A | 12/2012 |
| CN | 104380803 A | 2/2015 |

(Continued)

OTHER PUBLICATIONS

Huawei et al., "Overall high layer design of IAB," 3GPP TSG-RAN WG2 Ad Hoc, R2-1801131, pp. 1-5, (Jan. 12, 2017).

(Continued)

*Primary Examiner* — Brian S Roberts
(74) *Attorney, Agent, or Firm* — Maschoff Brennan

(57) ABSTRACT

Embodiments of the present disclosure provide a backhaul path switching method, a wireless relay, a network-side node and a terminal. In the embodiments of the present disclosure, a second backhaul path is pre-established, a backhaul path is switched in the case that a radio link fails or signal quality of a related wireless relay does not meet requirements.

19 Claims, 5 Drawing Sheets

(56) References Cited

U.S. PATENT DOCUMENTS

| | | | |
|---|---|---|---|
| 2007/0086387 A1 | 4/2007 | Kang et al. | |
| 2008/0002631 A1 | 1/2008 | Ramachandran | |
| 2013/0137431 A1 | 5/2013 | Aminaka | |
| 2013/0195005 A1 | 8/2013 | Al-Shalash | |
| 2014/0064181 A1* | 3/2014 | Srivastava | H04L 45/26 370/328 |
| 2014/0211762 A1 | 7/2014 | Bontu et al. | |
| 2015/0155930 A1 | 6/2015 | Liu et al. | |
| 2015/0181498 A1 | 6/2015 | Li et al. | |
| 2017/0006499 A1 | 1/2017 | Hampel et al. | |
| 2017/0289976 A1 | 10/2017 | Lai et al. | |
| 2018/0063848 A1 | 3/2018 | Ashrafi | |
| 2018/0092139 A1 | 3/2018 | Novlan et al. | |
| 2019/0053196 A1* | 2/2019 | Abedini | H04W 72/04 |

FOREIGN PATENT DOCUMENTS

| | | |
|---|---|---|
| CN | 104509164 A | 4/2015 |
| CN | 104604291 A | 5/2015 |
| CN | 106059647 A | 10/2016 |
| CN | 106341843 A | 1/2017 |
| EP | 2 830 356 A1 | 1/2015 |
| JP | 2013-090332 A | 5/2013 |
| JP | 2017-228814 A | 12/2017 |
| WO | 2013/111601 A1 | 8/2013 |
| WO | 2019/108022 A1 | 6/2019 |
| WO | 2020/165280 A1 | 8/2020 |

OTHER PUBLICATIONS

Samsung., "Deployment scenarios for Integrated Access and Backhaul," 3GPP TSG RAN WG1 NR Ad-Hoc#2, R1-1711615, pp. 1-4, (Jun. 24, 2017).
Qualcomm Incorporated., "IAB deployment considerations," 3GPP TSG-RAN WG2 NR Ad hoc 1801, R2-1800411, pp. 1-5, (Jan. 11, 2018).
Qualcomm Incorporated., "IAB—Control-plane Aspects," 3GPP TSG-RAN WG2 NR Ad hoc 1801, R2-1800414, pp. 1-3, (Jan. 11, 2018).
Ericsson., "Deployment scenarios and use cases for Integrated Access Backhaul," 3GPP TSG-RAN WG2 NR AH1801, R2-1801021, pp. 1-6, (Jan. 12, 2018).
LG Electronics Inc., "Consideration on route selection," 3GPP TSG-RAN WG2 NR Ad Hoc, R2-1801402, pp. 1-3, (Jan. 12, 2018).
International Search Report and Written Opinion of the International Searching Authority dated Apr. 18, 2019 as received in Application No. PCT/CN2019/073673.
CN Office Action dated Mar. 31, 2020 as received in Application No. 201810152153.6.
Partial Supplementary European Search Report dated Feb. 12, 2021 as received in Application No. 19754168.3.
KR Office Action dated Jun. 27, 2021 as received in Application No. 10-2020-7025633.
JP First Office Action dated Oct. 11, 2021 as received in Application No. 2020-543625.
U.S. Non-Final Office Action dated Jan. 31, 2022 as received in U.S. Appl. No. 16/970,314.
JP Second Office Action dated Apr. 18, 2022 as received in Application No. 2020-543625.
CN Office Action dated Jun. 27, 2022 as received in Application No. 202110276480.4.

* cited by examiner determining, by the first wireless relay, that a first backhaul path currently used by a terminal is required to be switched — 21 switching a backhaul path currently used by the terminal from the first backhaul path to the second backhaul path — 22

BACKHAUL PATH SWITCHING METHOD, WIRELESS RELAY, NETWORK-SIDE NODE AND TERMINAL

CROSS-REFERENCE TO RELATED APPLICATION

The present application is a continuation of U.S. patent application Ser. No. 16/970,314 filed on Aug. 14, 2020, which is the U.S. national phase of PCT Application No. PCT/CN2019/073673 filed on Jan. 29, 2019, which claims a priority to the Chinese patent application No. 201810152153.6 filed on Feb. 14, 2018, which are incorporated herein by reference in their entireties.

TECHNICAL FIELD

The present disclosure relates to the field of communications technologies, in particular to a backhaul path switching method, a wireless relay, a network-side node and a terminal.

BACKGROUND

In a $5^{th}$-Generation (5G) mobile communications system, the use of a wireless relay as a node device of a backhaul network is currently being studied. A wireless relay backhaul technology includes the use of a wireless backhaul link at a high frequency band of more than 6 GHz. For the wireless relay backhaul technology, one or more wireless relay nodes is added between a network side node and a terminal, so as to relay a wireless signal for one or more times, i.e., usually the wireless signal can reach the terminal in a multi-hop manner.

Taking a simple two-hop relay as an example, usually a link from the network side node to the terminal is divided into two links, i.e., a link from the network side node to a relay and a link from the relay to the terminal, and this gives an opportunity to replace a link with inferior quality with two links each with superior quality, so as to acquire a higher link capacity and a better coverage.

Due to poor stability of wireless link signals on a high frequency band, the wireless link signals are usually easily affected by environment, which may cause interruption of a wireless backhaul path. Therefore, there is an urgent need for a solution that can promptly recover data transmission when a backhaul path is interrupted.

SUMMARY

An embodiment of the present disclosure provides a backhaul path switching method, a wireless relay, a network-side node and a terminal, to promptly recover data transmission when a backhaul path is interrupted.

In a first aspect, an embodiment of the present disclosure provides a backhaul path switching method, and the method is applied to a first wireless relay and includes: determining, by the first wireless relay, that a first backhaul path currently used by a terminal is required to be switched, wherein at least the first backhaul path and a second backhaul path are pre-established for the terminal, each of the first backhaul path and the second backhaul path is from a network-side node to the terminal, the first wireless relay is a relay in the first backhaul path and the second backhaul path, and respective prior-hop relays or respective next-hop relays of the first wireless relay in the first backhaul path and the second backhaul path are different; switching a backhaul path currently used by the terminal from the first backhaul path to the second backhaul path.

In a second aspect, an embodiment of the present disclosure provides a backhaul path switching method, and the method is applied to a network-side node and includes: determining, by the network-side node, that a first backhaul path currently used by a terminal is required to be switched, wherein at least the first backhaul path and a second backhaul path are pre-established for the terminal, a first wireless relay is a relay in the first backhaul path and the second backhaul path, and respective prior-hop relays or respective next-hop relays of the first wireless relay in the first backhaul path and the second backhaul path are different; transmitting, by the network-side node, a notification message to the first wireless relay, wherein the notification message notifies the first wireless relay to switch the backhaul path currently used by the terminal.

In a third aspect, an embodiment of the present disclosure provides a backhaul path switching method, and the method is applied to a terminal and includes: measuring, by the terminal, signal quality of a neighbor relay of a first wireless relay; reporting, by the terminal, a measurement result of the signal quality of the neighbor relay to a network-side node or the first wireless relay, wherein the first wireless relay is a serving relay serving the terminal, or a prior-hop relay of the serving relay.

In a fourth aspect, an embodiment of the present disclosure provides a first wireless relay, the first wireless relay includes: a switching determination unit, used to determine that a first backhaul path currently used by a terminal is required to be switched, wherein at least the first backhaul path and a second backhaul path are pre-established for the terminal, each of the first backhaul path and the second backhaul path is from a network-side node to the terminal, the first wireless relay is a relay in the first backhaul path and the second backhaul path, and respective prior-hop relays or respective next-hop relays of the first wireless relay in the first backhaul path and the second backhaul path are different; a switching processing unit, used to switch a backhaul path currently used by the terminal from the first backhaul path to the second backhaul path.

In a fifth aspect, an embodiment of the present disclosure provides a first wireless relay, and the first wireless relay includes a processor, a memory, and a computer program stored in the memory and capable of being executed by the processor, wherein the processor is used to execute the computer program to implement the steps of the backhaul path switching method as described above.

In a sixth aspect, an embodiment of the present disclosure provides a network-side node, the network-side node includes: a switching determination unit, used to determine that a first backhaul path currently used by a terminal is required to be switched, wherein at least the first backhaul path and a second backhaul path are pre-established for the terminal, the first wireless relay is a relay in the first backhaul path and the second backhaul path, and respective prior-hop relays or respective next-hop relays of the first wireless relay in the first backhaul path and the second backhaul path are different; a switching notification unit, used to transmit a notification message to the first wireless relay, wherein the notification message notifies the first wireless relay to switch the backhaul path currently used by the terminal.

In a seventh aspect, an embodiment of the present disclosure provides a network-side node, and the network-side node includes a processor, a memory, and a computer program stored in the memory and capable of being executed by the processor, wherein the processor is used to execute the computer program to implement the steps of the backhaul path switching method as described above.

In an eighth aspect, an embodiment of the present disclosure provides a terminal, and the terminal includes: a measurement unit, used to measure signal quality of a neighbor relay of a first wireless relay; a reporting unit, used to report a measurement result of the signal quality of the neighbor relay to a network-side node or the first wireless relay, wherein the first wireless relay is a serving relay serving the terminal, or a prior-hop relay of the serving relay.

In a ninth aspect, an embodiment of the present disclosure provides a terminal, and the terminal includes a processor, a memory, and a computer program stored in the memory and capable of being executed by the processor, wherein the processor is used to execute the computer program to implement the steps of the backhaul path switching method described above.

In a tenth aspect, an embodiment of the present disclosure provides a computer-readable storage medium storing therein a computer program. The computer program is executed by a processor to implement steps of the backhaul path switching method as described above.

Therefore, the backhaul switching method, the wireless relay, the network-side node and the terminal provided in embodiments of the present disclosure, may promptly switch the first backhaul path currently used by the terminal to the pre-established second backhaul path if required, which improves a switching speed of the backhaul path and is capable of promptly recovering data transmission of the terminal.

BRIEF DESCRIPTION OF THE DRAWINGS

In order to illustrate the technical solutions of the present disclosure in a clearer manner, the drawings desired for the present disclosure will be described hereinafter briefly. Obviously, the following drawings merely relate to some embodiments of the present disclosure, and based on these drawings, a person skilled in the art may obtain the other drawings without any creative effort.

DETAILED DESCRIPTION

Figures 1, 2:
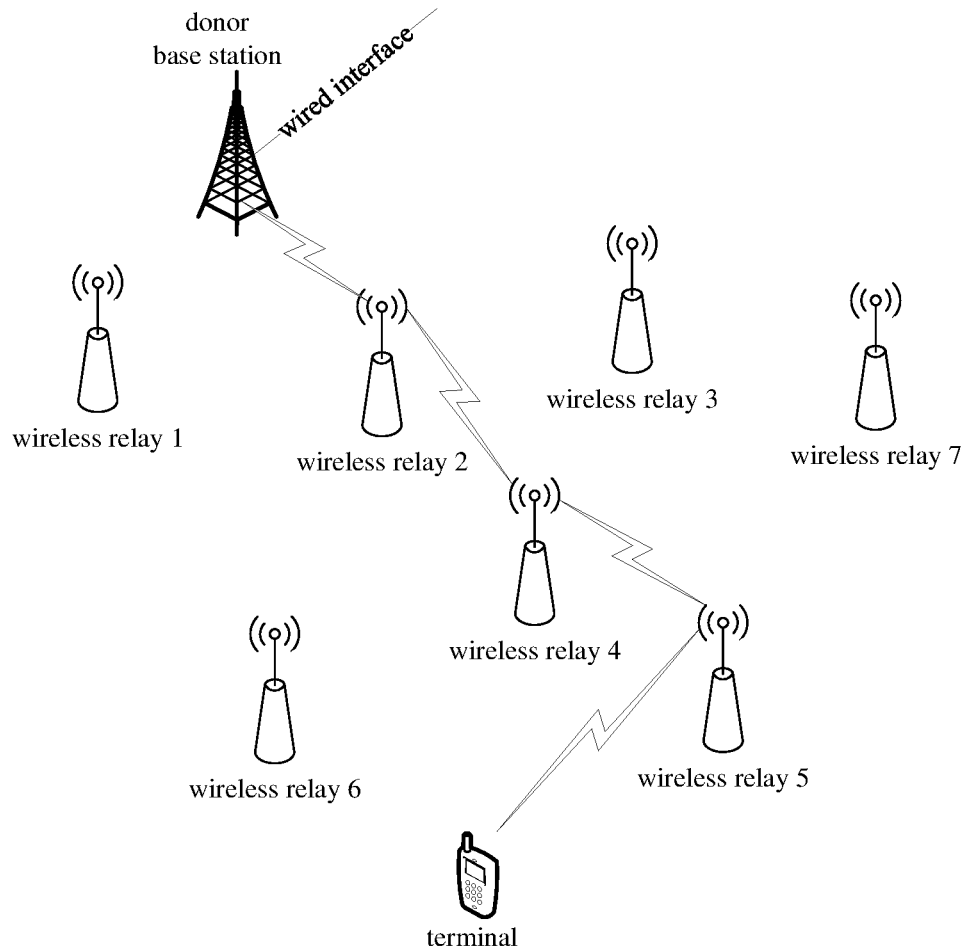
FIG. 1 is a schematic diagram showing an application scenario according to an embodiment of the present disclosure.
FIG. 2 is a flowchart of a backhaul path switching method provided in an embodiment of the present disclosure.

Hereinafter, exemplary embodiments of the present disclosure will be described in more detail with reference to the drawings. Although the exemplary embodiments of the present disclosure are shown in the drawings, it should be understood that the present disclosure can be implemented in various forms and should not be limited by the embodiments set forth herein. Rather, these embodiments are provided to enable a more thorough understanding of the present disclosure and to fully convey the scope of the present disclosure to a person skilled in the art.

Such words as "first" and "second" involved in the specification and the appended claims are merely used to differentiate similar objects, and do not have to be used to describe a specific order or sequence. It should be understood that the data used in this way are interchangeable under appropriate circumstances so that the embodiments of the present application described herein can be implemented in an order other than those illustrated or described herein, for example. In addition, the terms "including" and "having" and any variations thereof are intended to cover non-exclusive inclusions, for example, processes, methods, systems, products or devices that contain a series of steps or units need not be limited to those clearly listed Those steps or units may include other steps or units that are not clearly listed or are inherent to these processes, methods, products, or devices.

In the embodiments of the present disclosure, the form of a network side node will not be particularly defined, and it may be a macro base station (Macro Base Station), a pico base station (Pico Base Station), a Node B ($3^{rd}$-Generation (3G) base station), an evolved Node B (eNB), a Femto eNB (or Home eNode B or Home eNB or HeNB), a relay, an access point, a remote radio unit (Remote Radio Unit, RRU), a remote radio head (Remote Radio Head, RRH), or a network side node in a 5G mobile communications system, e.g., a central unit (Central Unit, CU) or a distributed unit (Distributed Unit, DU) of a base station (gNB). A terminal in the embodiments of the present disclosure may be a mobile phone (or cellular phone) or another device capable of transmitting or receiving a radio signal, including a User Equipment (UE), a Personal Digital Assistant (PDA), a wireless modem, a wireless communication device, a handheld device, a laptop computer, a cordless telephone, a Wireless Local Loop (WLL) station, a customer premise equipment (Customer Premise Equipment, CPE) capable of converting a mobile communication signal into a WiFi signal, a mobile smart hotspot, smart appliance, or another device capable of spontaneously communicating with a mobile communication network without manual operation.

FIG. 1 shows an example of a multi-hop wireless relay backhaul path. As shown in FIG. 1, a wireless backhaul network consists of wireless relays 1 to 7. In FIG. 1, the multi-hop backhaul path from the network side node (e.g., a donor base station, specifically a donor gNB) to the terminal through a wireless relay 2, a wireless relay 4 and a wireless relay 5 sequentially in that order. Taking a 5G system as an example, each wireless relay in FIG. 1 may be called as integrated access and backhaul (Integrated Access and Backhaul, IAB). The IAB may have a complete base station function, or merely have a data forwarding function similar to the base station. The network side node with wired interface connection is just the base station, which may also be called as donor Integrated Access and Backhaul (DIAB). The IAB may communicate with the DIAB via a wireless interface. Naturally, the IABs may also communicate with each other via a wireless interface. In the embodiments of the present disclosure, an IAB to which the terminal accesses and which is directly used to provide services to the terminal (UE) may be called as a serving IAB (Serving IAB, SIAB). In the above backhaul path, a previous-hop IAB of the SIAB may be called as NIAB (Next IAB).

In the 5G system, the use of a wireless relay as a node device of a backhaul network is currently being studied, so as to create the backhaul network. Currently, there is no definite scheme about how to establish and maintain a neighboring relationship between the wireless relays. In addition, when wireless relays operate in a high frequency band, due to poor stability of wireless link signals on the high frequency band, the wireless link signals are easily affected by environment, which may cause interruption of a wireless backhaul link. Therefore, an embodiment of the present disclosure further provides a method for promptly finding and establishing a new relay wireless backhaul link when a relay wireless backhaul link is interrupted. Each will be separately described below.

When transmission between wireless relays or between wireless relay and network-side nodes is interrupted, an embodiment of the present disclosure may promptly recover data transmission between the wireless relays or between the wireless relays and the network-side nodes. Referring to FIG. 2, an embodiment of the present disclosure provides a backhaul path switching method applied to a first wireless relay. As shown in FIG. 2, the method includes: Step 21, determining, by the first wireless relay, that a first backhaul path currently used by a terminal is required to be switched, wherein at least the first backhaul path and a second backhaul path are pre-established for the terminal, each of the first backhaul path and the second backhaul path is from a network-side node to the terminal, the first wireless relay is a relay in the first backhaul path and the second backhaul path, and respective prior-hop relays or respective next-hop relays of the first wireless relay in the first backhaul path and the second backhaul path are different.

In an embodiment of the present disclosure, the first wireless relay may determine that the first backhaul path currently used by the terminal is required to be switched in the case that radio link failure (Radio Link Failure, RLF) between the first wireless relay and a second wireless relay is detected. Here, the second wireless relay is a prior-hop relay or a next-hop relay of the first wireless relay in the first backhaul path. The prior-hop relay refers to the second wireless relay located upstream of the first wireless relay in the first backhaul path; on the other hand, the next-hop relay refers to the second wireless relay located downstream of the first wireless relay in the first backhaul path.

In another implementation, the first wireless relay may also determine that the first backhaul path currently used by the terminal is required to be switched in the case that the first wireless relay receives a notification message transmitted by a network-side node, the notification message notifies the first wireless relay to switch the backhaul path currently used by the terminal. In this case, switching of the backhaul path is controlled by the network-side node, e.g., the network-side node triggers switching of the backhaul path in the case that the network-side node finds radio link failure associated with the first wireless relay, or finds a backhaul path with better quality.

Step 22, switching a backhaul path currently used by the terminal from the first backhaul path to the second backhaul path.

In the above steps, the first wireless relay determines whether path switching is required, and if required, the backhaul path currently used by the terminal is switched from the first backhaul path to the second backhaul path to achieve switching of the backhaul path, so that the switching of the backhaul path may be performed in the case that the radio link fails or signal quality of the related wireless relay does not meet requirements. Since multiple backhaul paths are pre-established for the terminal in an embodiment of the present disclosure, time for reestablishing the backhaul paths may be saved when the path is switched, a speed of switching the path is improved, and data transmission of the terminal may be recovered promptly.

In addition, in order to facilitate network management and realize timely reporting of failure information, in an embodiment of the present disclosure, after the first wireless relay detects radio link failure between the first wireless relay and the second wireless relay, the first wireless relay may transmit indication information about the radio link failure to a neighbor relay and the network-side node to report the failure.

In an embodiment of the present disclosure, at least two second backhaul paths from the network side node to the terminal may be established for the terminal. In this case, the first wireless relay may switch the backhaul path being currently used from the first backhaul path to any one of the second backhaul paths. Further, in an embodiment of the present disclosure, the first wireless relay may also select a second backhaul path having the best signal quality from the at least two second backhaul paths as the target second backhaul path serving as the switching target according to a measurement result of signal quality of a wireless relay reported by the terminal, and then the backhaul path of the terminal is switched to the target second backhaul path. Here, the second backhaul path having the best signal quality may be a backhaul path, where a prior-hop relay having the best signal quality is located, among all the second backhaul paths, or a backhaul path, where a next-hop relay having the best signal quality is located, among all the second backhaul paths. The prior-hop relay here refers to a prior-hop relay of the first wireless relay in the second backhaul path, and the next-hop relay refers to a next-hop relay of the first wireless relay in the second backhaul path.

In order to find radio link failure (Radio Link Failure, RLF) in time, in an embodiment of the present disclosure, the first wireless relay may detect a radio signal of a pre-established neighbor relay, and the neighbor relay includes the second wireless relay; further, it is determined whether a radio link between the first wireless relay and the second wireless relay fails according to a detection result of the radio signal of the second wireless relay.

Further, in an embodiment of the present disclosure, prior to Step 21, a neighbor list of the first wireless relay may be pre-established, and the neighbor list includes at least one neighbor relay of the first wireless relay. Establishing the neighbor list may include: detecting, by the first wireless relay, a wireless relay around the first wireless relay by detecting a radio signal; transmitting, by the first wireless relay, information about the detected wireless relay to the network-side node, and receiving the neighbor list of the first wireless relay returned by the network-side node, or selecting a wireless relay whose signal quality meets a predetermined condition from detected wireless relays, to acquire the neighbor relay of the first wireless relay. Then, the first wireless relay may determine whether an interface between the first wireless relay and each neighbor relay in the neighbor list has been established. If there is a neighbor relay with respect to which the interface between the first wireless relay and the neighbor relay has not been established, the interface between the first wireless relay and the neighbor relay is further established.

In the embodiments of the present disclosure, as an implementation mode, reference signal receiving power (Reference Signal Receiving Power, RSRP) may be used as a reference for the signal quality. For example, when the RSRP of a certain wireless relay detected by the first wireless relay is greater than a predetermined reference threshold, the wireless relay may be selected as the neighbor relay. Naturally, in the embodiments of the present disclosure, another index for the signal quality, e.g., received signal strength indication (Received Signal Strength Indication, RSSI), signal to interference ratio (Signal to Interference Ratio, SIR) and signal to interference plus noise ratio (Signal to Interference plus Noise Ratio, SINR), may also be used.

Further, prior to establishing the neighbor list of the first wireless relay, the first wireless relay may join the backhaul network by establishing an interface between the first wireless relay and the network-side node or establishing an interface between the first wireless relay and other wireless relays. For example, after initial deployment or after startup/restart, the first wireless relay may establish the aforementioned interface between the first wireless relay and the network-side node or the interface between the first wireless relay and other wireless relays. Here, the other wireless relays are relays that have joined the backhaul network.

Specifically, a way for the first wireless relay to establish an interface between the first wireless relay and the network-side node may include: transmitting, by the first wireless relay, a first connection request message to the network side node when a signal from the network side node has been detected by the first wireless relay. The first connection request message may carry identification information for authenticating a relay identity of the first wireless relay, and the first connection request message may further carry one or more of a cell Identity (ID), a Physical Cell Identifier (PCI), a frequency and a beam index. Then, the network side node may transmit the first connection request message to a network element managing the wireless relay access, e.g., an access and mobility management (Access and Mobility Management, AMF) network element, for authentication. After the relay identity has been authenticated successfully, the network element may return information indicating that a connection request from the first wireless relay is accepted to the network side node. At this time, the network side node may transmit a first connection establishment message to the first wireless relay. The first wireless relay may receive the first connection establishment message transmitted from the network side node, and establish the interface between the first wireless relay and the network side node.

As another way for the first wireless relay to establish an interface between the first wireless relay and the network-side node, upon the receipt of a second connection establishment message forwarded by a third wireless relay, the first wireless relay may establish the interface between the first wireless relay and the network side node. Here, the third wireless relay may be a relay that has already joined the backhaul network. The second connection establishment message may be forwarded by the network side node through the third wireless relay. In this establishment mode, the interface may be established in accordance with the message forwarded by the third wireless relay between the network side node and the first wireless relay. In addition, prior to receiving the second connection establishment message, the first wireless relay may transmit a second connection request message to the third wireless relay when a signal from the third wireless relay has been detected by the first wireless relay, and the second connection request message may carry identification information for authenticating the relay identity of the first wireless relay. Similarly, the second connection request message may be forwarded to the network element managing the wireless relay access for authentication, which will not be particularly defined herein.

Apart from the establishment of the interface between the first wireless relay and the network side node to join the backhaul network, in the embodiments of the present disclosure, the first wireless relay may also join the backhaul network through establishing an interface between the first wireless relay and another wireless relay (which is called a second wireless relay herein for brevity) that has already joined the backhaul network. For example, the first wireless relay may transmit a third connection request message to the second wireless relay when a signal from the second wireless relay has been detected, and the third connection request message may carry the identification information for authenticating the relay identity of the first wireless relay. The second wireless relay may forward the third connection request message to the network element managing the wireless relay access for authentication, which will not be particularly defined herein. After the relay identity has been successfully authenticated, the second wireless relay may transmit a third connection establishment message to the first wireless relay. At this time, the first wireless relay may receive the third connection establishment message, and establish the interface between the first wireless relay and the second wireless relay.

In order to promptly switch the backhaul path, in an embodiment of the present disclosure, at least one second backhaul path is pre-established for the terminal. Specifically, as an implementation manner, in an embodiment of the present disclosure, establishing, by the first wireless relay, the second backhaul path specifically includes: receiving, by the first wireless relay, measurement report information transmitted by the terminal, wherein the measurement report information includes signal quality of a neighbor relay of a serving relay serving the terminal; establishing, by the first wireless relay, an interface from the first wireless relay to a first neighbor relay for the terminal according to the measurement report information, and forming the second backhaul path from the network-side node to the terminal, wherein the first neighbor relay is a relay, whose signal quality meets a preset threshold, among neighbor relays of the serving relay. By establishing an interface from the first wireless relay to the first neighbor relay for the terminal, binding relationship between the interface and the terminal is realized, so that data of the terminal may be forwarded via the interface, that is, a corresponding backhaul path is established.

Specifically, the first backhaul path and the second backhaul path established in an embodiment of the present disclosure may use different bearer resources for data transmission, or use a same bearer resource for data transmission, which is a transmission channel with separation of bearer at this time.

In addition, the first wireless relay may transmit measurement configuration information to the terminal in the case that the first wireless relay is a serving relay serving the terminal, wherein the measurement configuration information includes information about a neighbor relay of the first wireless relay, which is capable of indicating the terminal to measure signal quality of a neighbor relay of the serving relay. Further, the measurement configuration information may also include one or more of the following information: a preset threshold of the signal quality of the serving relay; a preset threshold of the signal quality of the neighbor relay of the serving relay. Based on the above preset threshold, the terminal may only feedback the signal quality of the serving relay/neighbor relay that meets the corresponding threshold to reduce amount of data to be transmitted.

In addition, in an embodiment of the present disclosure, only the control plane of the second backhaul path may be activated when the second backhaul path is established, and the user plane of the second backhaul path may not be activated, so as to save transmission resources. In this case, prior to switching the backhaul path currently used by the terminal from the first backhaul path to the second backhaul path, it is also necessary to activate the user plane of the second backhaul path firstly, and then a switching processing of the aforementioned path is performed.

The above embodiments implement that the first wireless relay pre-establishes a second backhaul path, and performs switching of a backhaul path if required, so that a recovery speed of failure may be increased, and data transmission of the terminal may be improved.

Figure 3:
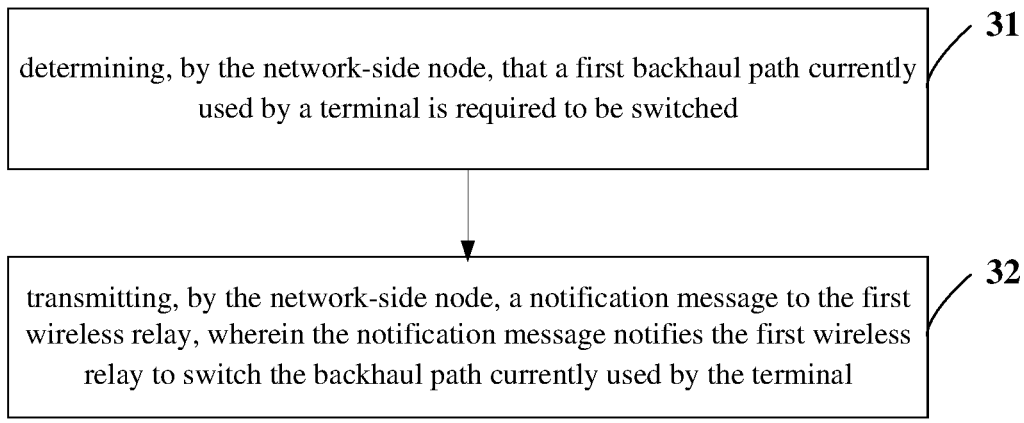
FIG. 3 is another flowchart of a backhaul path switching method provided in an embodiment of the present disclosure.

Next, the backhaul path switching method in an embodiment of the present disclosure will be described from a network-side node. Please refer to FIG. 3, the path switching method in an embodiment of the present disclosure applied to a network-side node includes:

Step 31, determining, by the network-side node, that a first backhaul path currently used by a terminal is required to be switched, wherein at least the first backhaul path and a second backhaul path are pre-established for the terminal, a first wireless relay is a relay in the first backhaul path and the second backhaul path, and respective prior-hop relays or respective next-hop relays of the first wireless relay in the first backhaul path and the second backhaul path are different.

Here, the network-side node determines that the first backhaul path currently used by the terminal is required to be switched in the case that the network-side node receives a report message about radio link failure reported by the first wireless relay, wherein the report message indicates that radio link failure between the first wireless relay and a second wireless relay fails. The second wireless relay is a prior-hop relay or a next-hop relay of the first wireless relay in the first backhaul path.

Step 32, transmitting, by the network-side node, a notification message to the first wireless relay, wherein the notification message notifies the first wireless relay to switch the backhaul path currently used by the terminal.

In the above steps, the network-side node determines whether path switching is required, and if required, the backhaul path currently used by the terminal is switched from the first backhaul path to the second backhaul path to achieve switching of the backhaul path, so that the switching of the backhaul path may be performed in the case that the radio link fails or signal quality of the related wireless relay does not meet requirements. Since multiple backhaul paths are pre-established for the terminal in an embodiment of the present disclosure, time for reestablishing the backhaul paths may be saved when the path is switched, a speed of switching the path is improved, and data transmission of the terminal may be recovered promptly.

Similarly, in an embodiment of the present disclosure, at least two second backhaul paths from the network side node to the terminal may be established for the terminal. In this case, the first wireless relay may switch the backhaul path currently used by the terminal from the first backhaul path to any one of the second backhaul paths. Further, in an embodiment of the present disclosure, the network-side node may also select a second backhaul path having the best signal quality from the at least two second backhaul paths as the target second backhaul path serving as the switching target according to a measurement result of signal quality of a wireless relay reported by the terminal, and then transmit the notification message to the first wireless relay, wherein the notification message is further used to indicate the second backhaul path serving as the switching target. Here, the second backhaul path having the best signal quality may be a backhaul path, where a prior-hop relay having the best signal quality is located, among all the second backhaul paths, or a backhaul path, where a next-hop relay having the best signal quality is located, among all the second backhaul paths. The prior-hop relay here refers to a prior-hop relay of the first wireless relay in the second backhaul path, and the next-hop relay refers to a next-hop relay of the first wireless relay in the second backhaul path.

In an embodiment of the present disclosure, the network-side node may also pre-establish at least one second backhaul path for the terminal. Specifically, prior to Step 31, the network-side node further establishes the second backhaul path for the terminal in the following way: receiving, by the network-side node, measurement report information from the terminal, wherein the measurement report information includes signal quality of a neighbor relay of a serving relay; then, establishing, by the network-side node, at least one of following interfaces for the terminal according to the measurement report information, forming the second backhaul path from the network-side node to the terminal: an interface from the network-side node to the first wireless relay, an interface from the network-side node to a first neighbor relay, and an interface from the network-side node to the first neighbor relay via the prior-hop relay. The first neighbor relay is a relay, whose signal quality meets a preset threshold, among neighbor relays of the serving relay.

Similarly, the network-side node in an embodiment of the present disclosure may also transmit measurement configuration information to the terminal, wherein the measurement configuration information includes information about a neighbor relay of the first wireless relay, which is capable of indicating the terminal to measure signal quality of the neighbor relay of the serving relay. Further, the measurement configuration information may also include one or more of the following information: a preset threshold of the signal quality of the serving relay; a preset threshold of the signal quality of the neighbor relay of the serving relay. Based on the above preset threshold, the terminal may only feedback the signal quality of the serving relay/neighbor relay that meets the corresponding threshold to reduce amount of data to be transmitted.

The following will further describe behavior during a process of switching of a backhaul path from a terminal side.

Figure 4:
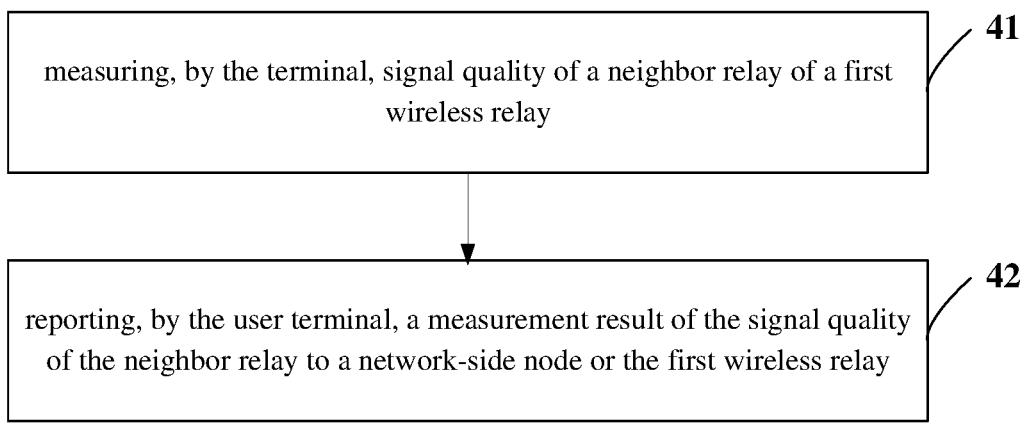
FIG. 4 is still another flowchart of a backhaul path switching method provided in an embodiment of the present disclosure.

As shown in FIG. 4, an embodiment of the present disclosure provides a backhaul path switching method, and the method is applied to a use equipment and includes:

Step 41, measuring, by the terminal, signal quality of a neighbor relay of a first wireless relay.

Step 42, reporting, by the terminal, a measurement result of the signal quality of the neighbor relay to a network-side node or the first wireless relay, wherein the first wireless relay is a serving relay SIAB of the terminal, or a prior-hop relay NIAB of the serving relay.

Here, prior to measuring the signal quality of the wireless relay, the terminal may also receive measurement configuration information transmitted by the network-side node or the first wireless relay, wherein the measurement configuration information includes information about the neighbor relay of the first wireless relay, so as to perform targeted measurement on the neighbor relay of the first wireless relay.

Further, the measurement configuration information may also include one or more of the following information: a preset threshold of the signal quality of the serving relay; a preset threshold of the signal quality of the neighbor relay of the serving relay. Based on the above preset threshold, the terminal may only feedback the signal quality of the serving relay/neighbor relay that meets the corresponding threshold to reduce amount of data to be transmitted.

In the backhaul path switching method of an embodiment of the present disclosure, a second backhaul path is pre-established, such that the first backhaul path currently used by a terminal may be promptly switched to the pre-established second backhaul path when required, which improves a switching speed of the backhaul path and is capable of promptly recovering data transmission of the terminal.

The above embodiments respectively describe in detail the backhaul path switching method in different scenarios. The following embodiments will further introduce its corresponding equipment in combination with the accompanying drawings.

Figure 5:
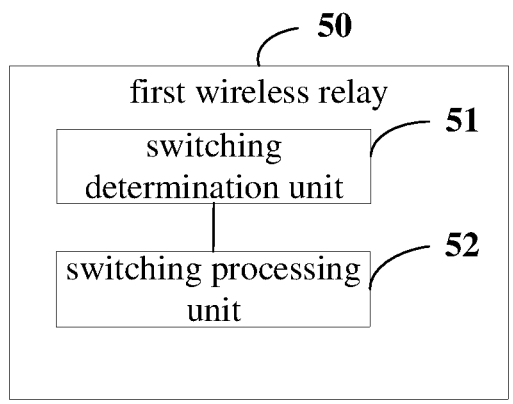
FIG. 5 is another schematic structural diagram illustrating a first wireless relay provided in an embodiment of the present disclosure.

Based on the backhaul path switching method provided in the above embodiments, an embodiment of the present disclosure further provides a first wireless relay 50. As shown in FIG. 5, the first wireless relay 50 includes: a switching determination unit 51, used to determine that a first backhaul path currently used by a terminal is required to be switched, wherein at least the first backhaul path and a second backhaul path are pre-established for the terminal, each of the first backhaul path and the second backhaul path is from a network-side node to the terminal, the first wireless relay is a relay in the first backhaul path and the second backhaul path, and respective prior-hop relays or respective next-hop relays of the first wireless relay in the first backhaul path and the second backhaul path are different; a switching processing unit 52, used to switch a backhaul path currently used by the terminal from the first backhaul path to the second backhaul path.

Preferably, the switching determination unit includes: a first detection unit, used to detect radio link failure between the first wireless relay and a second wireless relay, wherein the second wireless relay is a prior-hop relay or a next-hop relay of the first wireless relay in the first backhaul path; or a first reception unit, used to receive a notification message transmitted by the network-side node, wherein the notification message notifies the first wireless relay to switch the backhaul path currently used by the terminal.

Preferably, the first wireless relay also includes: an indication unit, used to transmit, after radio link failure between the first wireless relay and the second wireless relay is detected, indication information about the radio link failure to a neighbor relay and the network-side node.

Preferably, the first wireless relay also includes: a path selection unit, used to select, in the case that there are at least two second backhaul paths, a second backhaul path having best signal quality from the at least two second backhaul paths as the second backhaul path serving as the switching target according to a measurement result of signal quality of a wireless relay reported by the terminal.

Preferably, the first detection unit in the first wireless relay is specifically used to: detect a radio signal of a pre-established neighbor relay, wherein the neighbor relay includes the second wireless relay; determine whether a link between the first wireless relay and the second wireless relay fails according to a detection result of the radio signal of the second wireless relay.

Preferably, the first wireless relay also includes: a neighbor establishment unit, used to detect a wireless relay around the first wireless relay by detecting a radio signal; transmit information about the detected wireless relay to the network-side node, and receive the neighbor list of the first wireless relay returned by the network-side node, or select a wireless relay whose signal quality meets a predetermined condition from detected wireless relays, to acquire the neighbor relay of the first wireless relay; and establish an interface between the first wireless relay and the neighbor relay.

Preferably, the first wireless relay also includes: a path establishment unit, used to receive measurement report information transmitted by the terminal, wherein the measurement report information includes signal quality of a neighbor relay of a serving relay serving the terminal; establish an interface from the first wireless relay to a first neighbor relay for the terminal according to the measurement report information, and form the second backhaul path from the network-side node to the terminal, wherein the first neighbor relay is a relay, whose signal quality meets a preset threshold, among neighbor relays of the serving relay.

Preferably, the first backhaul path and the second backhaul path use different bearer resources for data transmission, or the first backhaul path and the second backhaul path use a same bearer resource for data transmission.

Preferably, the first wireless relay also includes: a configuration transmitting unit, used to transmit measurement configuration information to the terminal, wherein the measurement configuration information includes information about a neighbor relay of the first wireless relay.

Preferably, the first wireless relay also includes: an activation processing unit, used to activate, prior to switching the backhaul path currently used by the terminal from the first backhaul path to the second backhaul path in the case that a user plane of the second backhaul path is not activated, the user plane of the second backhaul path.

Figure 6:
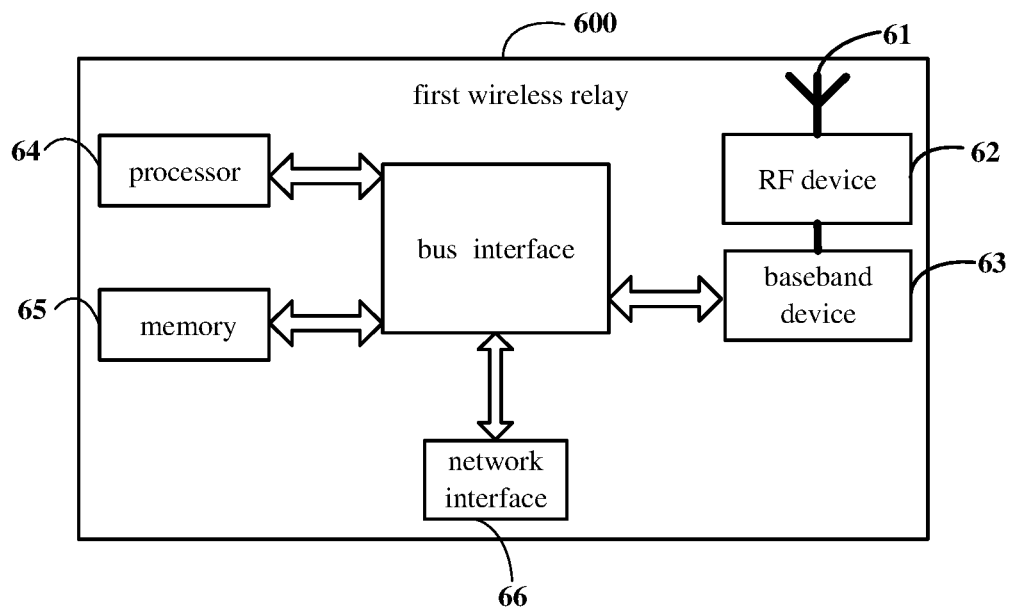
FIG. 6 is another block diagram illustrating a first wireless relay provided in an embodiment of the present disclosure.

The present disclosure further provides in an embodiment another first wireless relay. As shown in FIG. 6, the first wireless relay 600 includes an antenna 61, a Radio Frequency (RF) device 62, and a baseband device 63. The antenna 61 is connected to the radio frequency device 62. In an uplink direction, the radio frequency device 62 is used to receive information via the antenna 61, and transmit the received information to the baseband device 63 for processing. In a downlink direction, the baseband device 63 is used to process to-be-transmitted information, and transmit the processed information to the radio frequency device 62. The radio frequency device 62 is used to process the received information and transmit the processed information via the antenna 61.

A frequency band processing unit may be located within the baseband device 63, so that the above methods for the first wireless relay may be implemented within the baseband device 63. The baseband device 63 may include a processor 64 and a memory 65.

The baseband device 63 may, e.g., include at least one baseband board on which a plurality of chips is located, as shown in FIG. 6. One chip may be, e.g., the processor 64 connected to the memory 65 and used to call a program stored in the memory 65 so as to perform operations for the first wireless relay in the above-mentioned method embodiments.

The baseband device 63 may further include a network interface 66 used to exchange information with the radio frequency device 62. The network interface may be, e.g., a common public radio interface (Common Public Radio Interface, CPRI).

Here, the processor may include merely one processor, or a plurality of processing elements. For example, the processor may be a Central Processing Unit (CPU), an Application-Specific Integrated Circuit (ASIC), or one or more Integrated Circuits (ICs) configured to implement the above-mentioned methods for the first wireless relay, e.g., one or more Digital Signal Processors (DSPs), or one or more Field Programmable Gate Arrays (FPGAs). The memory may include merely one memory, or a plurality of storage elements.

The memory 65 may be a volatile memory, a nonvolatile memory or both. The nonvolatile memory may be a read-only memory (Read-Only Memory, ROM), a programmable ROM (Programmable ROM, PROM), an erasable PROM (Erasable PROM, EPROM), an electrically EPROM (Electrically EPROM, EEPROM) or a flash memory. The volatile memory may be a random access memory (Random Access Memory, RAM) which serves as an external high-speed cache. Illustratively but nonrestrictively, the RAM may be in various forms, e.g., static RAM (Static RAM, SRAM), dynamic RAM (Dynamic RAM, DRAM), synchronous DRAM (Synchronous DRAM, SDRAM), double data rate SDRAM (Double Data Rate SDRAM, DDRSDRAM), enhanced SDRAM (Enhanced SDRAM, ESDRAM), synchronous link DRAM (Synchronous Link DRAM, SLDRAM) or direct Rambus RAM (Direct Rambus RAM, DRRAM). The memory 65 intends to include, but not limited to, the above-mentioned and any other appropriate memories.

To be specific, in the embodiments of the present disclosure, the first wireless relay may further include a computer program stored in the memory 65 and executed by the processor 64. The processor 64 is used to call the computer program stored in the memory 65, so as to implement the method executed by the modules in FIG. 5.

Specifically, the computer program is called by the processor 64 to implement: determining that a first backhaul path currently used by a terminal is required to be switched, wherein at least the first backhaul path and a second backhaul path are pre-established for the terminal, each of the first backhaul path and the second backhaul path is from a network-side node to the terminal, the first wireless relay is a relay in the first backhaul path and the second backhaul path, and respective prior-hop relays or respective next-hop relays of the first wireless relay in the first backhaul path and the second backhaul path are different; switching a backhaul path currently used by the terminal from the first backhaul path to the second backhaul path.

Specifically, the computer program is called by the processor 64 to implement: detecting radio link failure between the first wireless relay and a second wireless relay, wherein the second wireless relay is a prior-hop relay or a next-hop relay of the first wireless relay in the first backhaul path; or receiving a notification message transmitted by the network-side node, wherein the notification message notifies the first wireless relay to switch the backhaul path currently used by the terminal.

Specifically, the computer program is called by the processor 64 to implement: transmitting indication information about the radio link failure to a neighbor relay and the network-side node.

Specifically, the computer program is called by the processor 64 to implement: in the case that there are at least two second backhaul paths, selecting, prior to switching the backhaul path currently used by the terminal from the first backhaul path to the second backhaul path, a second backhaul path having best signal quality from the at least two second backhaul paths as the second backhaul path of the switching target according to a measurement result of signal quality of a wireless relay reported by the terminal.

Specifically, the computer program is called by the processor 64 to implement: detecting a radio signal of a pre-established neighbor relay, and the neighbor relay includes the second wireless relay; determining whether a link between the first wireless relay and the second wireless relay fails according to a detection result of the radio signal of the second wireless relay.

Specifically, the computer program is called by the processor 64 to implement: detecting a wireless relay around the first wireless relay by detecting a radio signal; transmitting information about the detected wireless relay to the network-side node, and receiving the neighbor list of the first wireless relay returned by the network-side node, or selecting a wireless relay whose signal quality meets a predetermined condition from detected wireless relays, to acquire the neighbor relay of the first wireless relay; and establishing an interface between the first wireless relay and the neighbor relay.

Here, the first backhaul path and the second backhaul path use different bearer resources for data transmission, or the first backhaul path and the second backhaul path use a same bearer resource for data transmission.

Specifically, the computer program is called by the processor 64 to implement: receiving measurement report information transmitted by the terminal, wherein the measurement report information includes signal quality of a neighbor relay of a serving relay serving the terminal; establishing, by the first wireless relay, an interface from the first wireless relay to a first neighbor relay for the terminal according to the measurement report information, and forming the second backhaul path from the network-side node to the terminal, wherein the first neighbor relay is a relay, whose signal quality meets a preset threshold, among neighbor relays of the serving relay.

Specifically, the computer program is called by the processor 64 to implement: prior to receiving the measurement report information transmitted by the terminal in the case that the first wireless relay is the serving relay, transmitting, by the first wireless relay, measurement configuration information to the terminal, wherein the measurement configuration information includes information about a neighbor relay of the first wireless relay.

Specifically, the computer program is called by the processor 64 to implement: in the case that a user plane of the second backhaul path is not activated, activating, prior to switching the backhaul path currently used by the terminal from the first backhaul path to the second backhaul path, the user plane of the second backhaul path.

Figure 7:
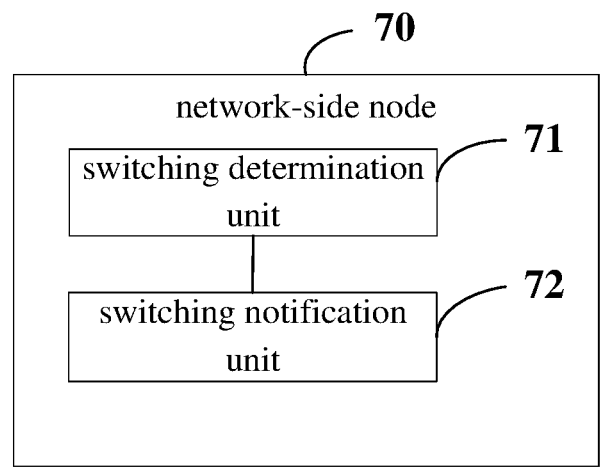
FIG. 7 is another schematic structural diagram illustrating a network-side node provided in an embodiment of the present disclosure.

Referring to FIG. 7, an embodiment of the present disclosure provides a network-side node 70, the network-side node 70 includes: a switching determination unit 71, used to determine that a first backhaul path currently used by a terminal is required to be switched, wherein at least the first backhaul path and a second backhaul path are pre-established for the terminal, the first wireless relay is a relay in the first backhaul path and the second backhaul path, and respective prior-hop relays or respective next-hop relays of the first wireless relay in the first backhaul path and the second backhaul path are different; a switching notification unit 72, used to transmit a notification message to the first wireless relay, wherein the notification message notifies the first wireless relay to switch the backhaul path currently used by the terminal.

Preferably, the switching determination unit is specifically used to determine that the first backhaul path currently used by the terminal is required to be switched in the case that a report message about radio link failure reported by the first wireless relay is received, wherein the report message indicates radio link failure between the first wireless relay and a second wireless relay, the second wireless relay is a prior-hop relay or a next-hop relay of the first wireless relay in the first backhaul path.

Preferably, the switching notification unit is specifically used to receive a measurement result of signal quality of a wireless relay from the terminal in the case that there are at least two second backhaul paths, select a second backhaul path, where a next-hop relay having best signal quality is located, from the at least two second backhaul paths as the second backhaul path serving as the switching target; transmit the notification message to the first wireless relay, wherein the notification message is further used to indicate the second backhaul path serving as the switching target.

Preferably, the network-side node also includes: a path establishment unit, used to receive measurement report information from the terminal, wherein the measurement report information includes signal quality of a neighbor relay of a serving relay serving the terminal; establish at least one of following interfaces for the terminal according to the measurement report information, to form the second backhaul path from the network-side node to the terminal: an interface from the network-side node to the first wireless relay, an interface from the network-side node to a first neighbor relay, and an interface from the network-side node to the first neighbor relay via the prior-hop relay.

The first neighbor relay is a relay, whose signal quality meets a preset threshold, among neighbor relays of the serving relay.

Preferably, the network-side node also includes: a configuration transmitting unit, used to transmit measurement configuration information to the terminal, wherein the measurement configuration information includes information about a neighbor relay of the first wireless relay.

Figure 8:
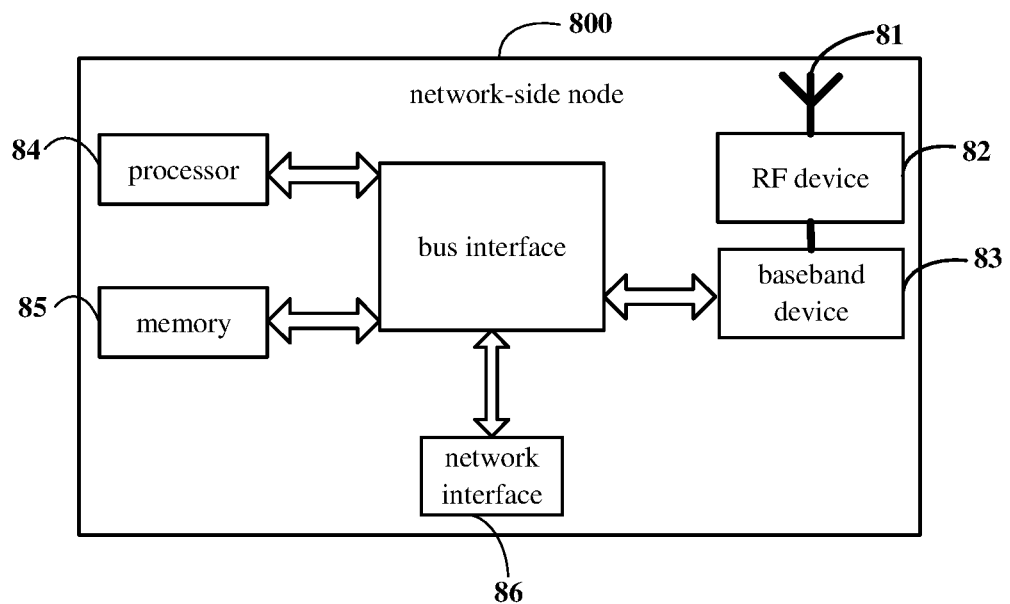
FIG. 8 is another block diagram illustrating a network-side node provided in an embodiment of the present disclosure.

Specifically, an embodiment of the present disclosure further provides another network-side node. As shown in FIG. 8, the network side node 800 includes an antenna 81, a radio frequency device 82, and a baseband device 83. The antenna 81 is connected to the radio frequency device 82. In an uplink direction, the radio frequency device 82 is used to receive information via the antenna 81, and transmit the received information to the baseband device 83 for processing. In a downlink direction, the baseband device 83 is used to process to-be-transmitted information, and transmit the processed information to the radio frequency device 82. The radio frequency device 82 is used to process the received information and transmit the processed information via the antenna 81.

The frequency band processing device may be located within the baseband device 83, so that the above method for the network side node may be implemented within the baseband device 83. The baseband device 83 may include a processor 84 and a memory 85.

The baseband device 83 may, e.g., include at least one baseband board on which a plurality of chips is located, as shown in FIG. 8. One chip may be, e.g., the processor 84 connected to the memory 85 and used to call a program stored in the memory 85 so as to perform operations for the network side node in the above-mentioned method embodiments.

The baseband device 83 may further include a network interface 86 used to exchange information with the radio frequency device 82. The network interface may be, e.g., a common public radio interface (Common Public Radio Interface, CPRI).

Here, the processor may include merely one processor, or a plurality of processing elements. For example, the processor may be a CPU, an ASIC, or one or more ICs configured to implement the above-mentioned methods for the network side node, e.g., one or more DSPs, or one or more FPGAs. The memory may include merely one memory, or a plurality of storage elements.

The memory 85 may be a volatile memory, a nonvolatile memory or both. The nonvolatile memory may be a read-only memory (Read-Only Memory, ROM), a programmable ROM (Programmable ROM, PROM), an erasable PROM (Erasable PROM, EPROM), an electrically EPROM (Electrically EPROM, EEPROM) or a flash memory. The volatile memory may be a random access memory (Random Access Memory, RAM) which serves as an external high-speed cache. Illustratively but nonrestrictively, the RAM may be in various forms, e.g., static RAM (Static RAM, SRAM), dynamic RAM (Dynamic RAM, DRAM), synchronous DRAM (Synchronous DRAM, SDRAM), double data rate SDRAM (Double Data Rate SDRAM, DDRSDRAM), enhanced SDRAM (Enhanced SDRAM, ESDRAM), synchronous link DRAM (Synchronous Link DRAM, SLDRAM) or direct Rambus RAM (Direct Rambus RAM, DRRAM). The memory 85 intends to include, but not limited to, the above-mentioned and any other appropriate memories.

To be specific, in the embodiments of the present disclosure, the network side node may further include a computer program stored in the memory 85 and executed by the processor 84. The processor 84 is used to call the computer program stored in the memory 85, so as to implement the method executed by the modules in FIG. 7.

Specifically, the computer program is called by the processor 84 to implement: determining that a first backhaul path currently used by a terminal is required to be switched, wherein at least the first backhaul path and a second backhaul path are pre-established for the terminal, a first wireless relay is a relay in the first backhaul path and the second backhaul path, and respective prior-hop relays or respective next-hop relays of the first wireless relay in the first backhaul path and the second backhaul path are different; transmitting a notification message to the first wireless relay, wherein the notification message notifies the first wireless relay to switch the backhaul path currently used by the terminal.

The computer program is called by the processor 84 to further implement: receiving a report message about radio link failure reported by the first wireless relay, wherein the report message indicates radio link failure between the first wireless relay and a second wireless relay, the second wireless relay is a prior-hop relay or a next-hop relay of the first wireless relay in the first backhaul path.

The computer program is called by the processor 84 to further implement: receiving a measurement result of signal quality of a wireless relay from the terminal, selecting a second backhaul path, where a next-hop relay having best signal quality is located, from the at least two second backhaul paths as the second backhaul path serving as the switching target; transmitting the notification message to the first wireless relay, wherein the notification message is further used to indicate the second backhaul path serving as the switching target.

The computer program is called by the processor 84 to further implement: receiving measurement report information from the terminal, wherein the measurement report information includes signal quality of a neighbor relay of a serving relay serving the terminal; establishing at least one of following interfaces for the terminal according to the measurement report information, to form the second backhaul path from the network-side node to the terminal: an interface from the network-side node to the first wireless relay, an interface from the network-side node to a first neighbor relay, and an interface from the network-side node to the first neighbor relay via the prior-hop relay.

The first neighbor relay is a relay, whose signal quality meets a preset threshold, among neighbor relays of the serving relay.

The computer program is called by the processor 84 to further implement: transmitting measurement configuration information to the terminal, wherein the measurement configuration information includes information about a neighbor relay of the first wireless relay.

Figure 9:
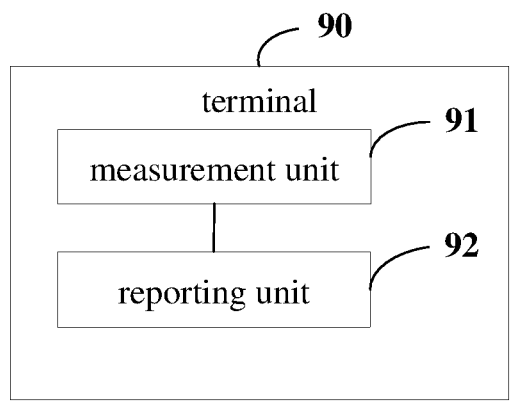
FIG. 9 is another schematic structural diagram illustrating a terminal provided in an embodiment of the present disclosure.

Referring to FIG. 9, an embodiment of the present disclosure provides a terminal 90, the terminal 90 includes: a measurement unit 91, used to measure signal quality of a neighbor relay of a first wireless relay; a reporting unit 92, used to report a measurement result of the signal quality of the neighbor relay to a network-side node or the first wireless relay, wherein the first wireless relay is a serving relay SIAB of the terminal, or a prior-hop relay NIAB of the serving relay.

Preferably, the terminal further includes: a configuration reception unit, used to receive measurement configuration information transmitted by the network-side node or the first wireless relay, wherein the measurement configuration information includes information about the neighbor relay of the first wireless relay.

Figure 10:
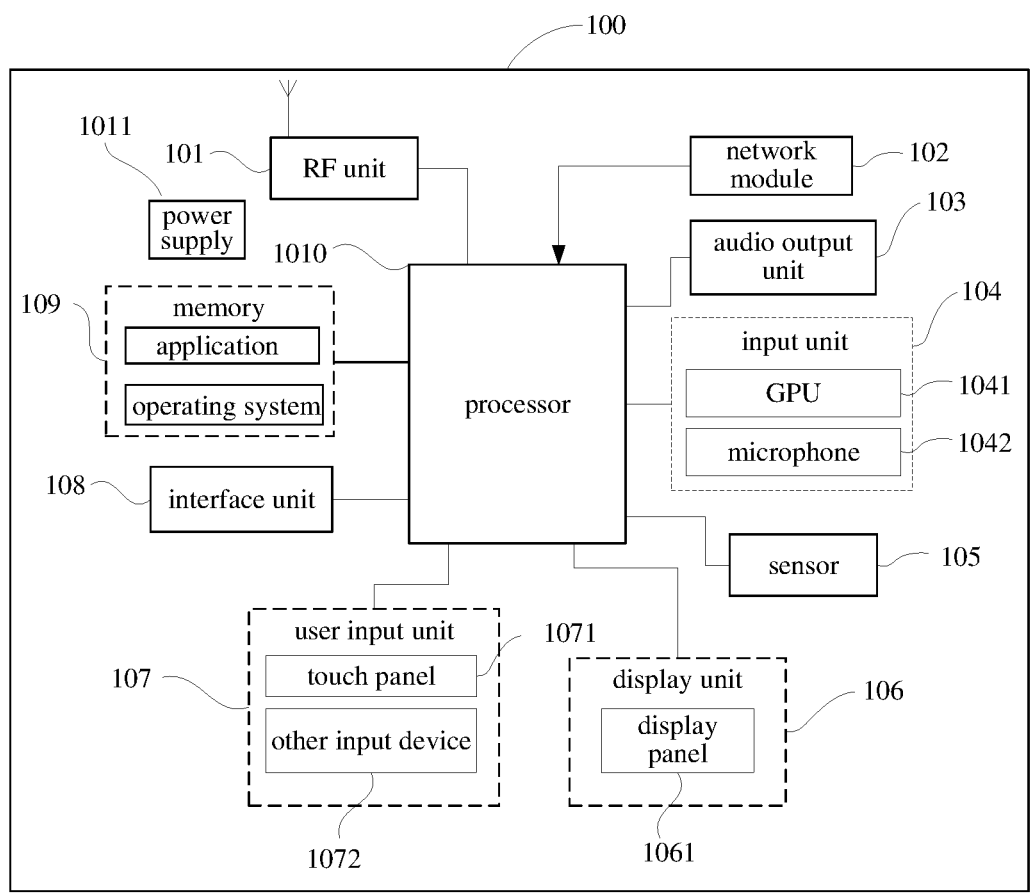
FIG. 10 is another block diagram of a terminal provided in an embodiment of the present disclosure.

In order to achieve the above purpose in a better manner, further, FIG. 10 is a schematic diagram of a hardware structure of a terminal that implements various embodiment of the present disclosure. The terminal 100 includes, but is not limited to, a radio frequency unit 101, a network module 102, and an audio output unit 103, an input unit 104, a sensor 105, a display unit 106, a user input unit 107, an interface unit 108, a memory 109, a processor 1010, and a power supply 1011 and other components. A person skilled in the art may understand that the structure of the terminal shown in FIG. 10 does not constitute a limitation on the terminal, and the terminal may include more or fewer components than shown in the figure, or some combined components, or different arrangements of components. In the embodiment of the present disclosure, the terminal includes, but is not limited to, a mobile phone, a tablet computer, a notebook computer, a palmtop computer, an on-board terminal, a wearable device, a pedometer, and the like.

The radio frequency unit 101 is used to measure signal quality of a neighbor relay of a first wireless relay; report a measurement result of the signal quality of the neighbor relay to a network-side node or the first wireless relay, wherein the first wireless relay is a serving relay SIAB of the terminal, or a prior-hop relay NIAB of the serving relay.

The radio frequency unit 101 is used to receive measurement configuration information transmitted by the network-side node or the first wireless relay, wherein the measurement configuration information includes information about the neighbor relay of the first wireless relay.

It should be understood that, in an embodiment of the present disclosure, the radio frequency unit 101 may be used to receive and transmit information or transmit and receive signals during a call. Specifically, downlink data from a base station is received and processed by the processor 1010; in addition, uplink data is transmitted to the base station. Generally, the radio frequency unit 101 includes, but is not limited to, an antenna, at least one amplifier, a transceiver, a coupler, a low-noise amplifier, a duplexer, and the like. In addition, the radio frequency unit 101 may also communicate with a network and other devices through a wireless communication system.

The terminal provides users with wireless broadband Internet access through the network module 102, such as helping users to transmit and receive email, to browse web pages, and to access streaming media, etc.

The audio output unit 103 may convert audio data received by the radio frequency unit 101 or the network module 102 or stored in the memory 109 into audio signals and output them as sound. Moreover, the audio output unit 103 may further provide audio output (for example, call signal reception sound, message reception sound, etc.) related to a specific function performed by the terminal 100. The audio output unit 103 includes a speaker, a buzzer, a receiver, and the like.

The input unit 104 is used to receive audio signals or video signals. The input unit 104 may include a graphics processing unit (Graphics Processing Unit, GPU) 1041 and a microphone 1042, and the graphics processing unit 1041 processes image data of a still picture or video obtained by an image capture device (such as a camera) in a video capture mode or an image capture mode. The processed image frames may be displayed on the display unit 106. The image frames processed by the graphics processing unit 1041 may be stored in the memory 109 (or other storage medium) or transmitted via the radio frequency unit 101 or the network module 102. The microphone 1042 may receive sound, and may process such sound into audio data. The processed audio data may be converted into an output format that may be transmitted to a mobile communication base station via the radio frequency unit 101 in the case of a telephone call mode.

The terminal 100 further includes at least one sensor 105, such as a light sensor, a motion sensor, and other sensors. Specifically, the light sensor includes an ambient light sensor and a proximity sensor, wherein the ambient light sensor may adjust brightness of a display panel 1061 according to brightness of the ambient light, and the proximity sensor may turn off the display panel 1061 and/or backlight in the case that the terminal 100 is moved to an ear. As a type of the motion sensor, an accelerometer sensor may detect a magnitude of acceleration in various directions (usually three axes), and detect a magnitude and direction of gravity in the case of stationary, and be used to identify attitude of the terminal (such as horizontal and vertical screen switching, related games, magnetometer attitude calibration), vibration recognition related functions (such as pedometer, tap), etc.; the sensor 105 may also include a fingerprint sensor, a pressure sensor, an iris sensor, a molecular sensor, a gyroscope, a barometer, a hygrometer, a thermometer, an infrared sensor and the like, which are not repeated here.

The display unit 106 may be used to display information inputted by the user or information provided to the user. The display unit 106 may include the display panel 1061, and the display panel 1061 may be configured as a form of a liquid crystal display (Liquid Crystal Display, LCD), an organic light-emitting diode (Organic Light-Emitting Diode, OLED) or the like.

The user input unit 107 may be used to receive numeric information or character information input by a user and generate a signal input related to the user's settings and related to the function control of the terminal. Specifically, the user input unit 107 includes a touch panel 1071 and other input devices 1072. The touch panel 1071, also referred to as a touch screen, may collect the user's touch operations thereon or nearby (such as the user's operation on the touch panel 1071 or near the touch panel 1071 using any suitable object or accessory such as a finger or a stylus). The touch panel 1071 may include two parts, namely a touch detection device and a touch controller. The touch detection device detects the touch orientation of the user, and detects a signal generated by the touch operation, and transmits the signal to the touch controller; the touch controller receives touch information from the touch detection device, converts the touch information into a coordinate of a touch point, transmits the coordinate to the processor 1010, and may receive and execute a command from the processor 1010. In addition, the touch panel 1071 can be implemented in various types such as resistive, capacitive, infrared, and surface acoustic waves, etc. In addition to the touch panel 1071, the user input unit 107 may further include another input device 1072. Specifically, the other input device 1072 may include, but are not limited to, a physical keyboard, a function button (such as a volume control button, a switch button, etc.), a trackball, a mouse, a joystick, and details thereof are not described herein again.

Further, the touch panel 1071 may cover the display panel 1061, in the case that the touch screen 1071 detects a touch operation thereon or nearby, the touch operation is transmitted to the processor 1010 to determine the type of the touch event, then the processor 1010 provides a corresponding visual output on the display screen 1061 based on the type of the touch event. Although in FIG. 10, the touch panel 1071 and the display panel 1061 are implemented as two independent components to implement input and output functions of the terminal, in an embodiment, the touch panel 1071 and the display panel 1061 may be integrated to implement the input and output functions of the terminal, which are not limited here.

The interface unit 108 is an interface through which an external device is connected to the terminal 100. For example, the external device may include a wired or wireless headset port, an external power supply (or battery charger) port, a wired or wireless data port, a memory card port, a port for connecting a device with an identification module, and an audio Input/Output (I/O) port, a video I/O port, or a headphone port, etc. The interface unit 108 may be used to receive input (e.g., data information, power, etc.) from the external device and transmit the received input to one or more elements within the terminal 100 or may be used to transmit data between the terminal 100 and the external device.

The memory 109 may be used to store software programs and various data. The memory 109 may mainly include a program storage area and a data storage area, wherein the program storage area may store an operating system, an application (such as a sound playback function, an image playback function, etc.) required for at least one function, and the like; the data storage area may store data (such as audio data, a phone book, etc.) created based on the use of a mobile phone and the like. In addition, the memory 109 may include a high-speed random access memory, and may further include a non-volatile memory, such as at least one magnetic disk storage device, a flash storage device, or other volatile solid-state storage device.

The processor 1010 is a control center of the terminal, and uses various interfaces and lines to connect various parts of the entire terminal. By running or executing software programs and/or modules stored in the memory 109 and calling data stored in the memory 109, various functions of the terminal and processing data are performed, so that the overall monitoring of the terminal is performed. The processor 1010 may include one or more processing units; preferably, the processor 1010 may integrate an application processor and a modem processor, wherein the application processor mainly processes an operating system, a user interface, and an application program, etc. The modem processor mainly handles wireless communication. It could be understood that, alternatively, the modem processor may not be integrated into the processor 1010.

The terminal 100 may further include a power source 1011 (such as a battery) for supplying power to various components. Preferably, the power supply 1011 may be logically connected to the processor 1010 through a power management system, so as to implement functions such as management of charging, management of discharging, and power consumption management through the power management system.

In addition, the terminal 100 includes some functional modules that are not shown, and details are not described herein again.

Preferably, an embodiment of the present disclosure further provides a terminal, and the terminal includes: a processor 1010, a memory 109, and a computer program stored in the memory 109 and executable on the processor 1010, the processor 1010 is used to execute the computer program to implement various processes in the method embodiment of indicating resource scheduling, and the same technical effect may be achieved, which will not be repeated herein to avoid repetition. The terminal may be a wireless terminal or a wired terminal, and the wireless terminal may be a device that provides voice and/or other service data connectivity to the user, a handheld device having a wireless connecting function, or another processing device connected to a wireless modem. The wireless terminal may communicate with one or more core networks via a radio access network (Radio Access Network, RAN), and the wireless terminal may be a mobile terminal, such as a mobile phone (or referred to as "cellular" phone) and a computer having a mobile terminal, for example, a portable device, a pocket device, a handheld device, a computer built-in device or an on-board mobile device that exchanges language and/or data with a wireless access network, for example, a personal communication service (Personal Communication Service, PCS) telephone, a cordless telephone, a session initiation protocol (Session Initiation Protocol, SIP) telephone, a wireless local loop (Wireless Local Loop, WLL) station, a personal digital assistant (Personal Digital Assistant, PDA) and other devices. The wireless terminal may also be referred to as a system, a subscriber unit (Subscriber Unit), a subscriber station (Subscriber Station), a mobile station (Mobile Station), a mobile (Mobile), a remote station (Remote Station), a remote terminal (Remote Terminal), and an access terminal (Access Terminal), a user terminal (User Terminal), a user agent (User Agent), or a user equipment (User Equipment) or a user device (User Device), which are not limited herein.

In order to achieve the above purpose in a better manner, an embodiment of the present disclosure further provides a network-side node or a first wireless relay, and the network-side node or the first wireless relay includes a processor, a memory, and a computer program stored in the memory and capable of being executed by the processor, the processor is used to execute the computer program to implement the steps of the backhaul path switching method described above.

An embodiment of the present disclosure further provides a terminal, and the terminal includes a processor, a memory, and a computer program stored in the memory and capable of being executed by the processor, the processor is used to execute the computer program to implement the steps of the backhaul path switching method described above.

An embodiment of the present disclosure further provides a computer-readable storage medium storing therein a computer program. The computer program is executed by a processor so as to implement steps of the backhaul path switching method as described above. The computer-readable storage medium may be a read-only memory (Read-Only Memory, ROM), a random access memory (Random Access Memory, RAM), a magnetic disk or an optical disk.

It should be further appreciated that, the above modules of the network device and the terminal are divided merely on the basis of their logic functions, and in actual use, they may be completely or partially integrated into a physical entity, or physically separated from each other. And these modules can all be implemented in the form of software called by processing elements; or they can also be all implemented in the form of hardware; or some modules can be implemented in the form of calling software by processing elements, and some of the modules are implemented in the form of hardware. For example, the determination module may be a processing element arranged separately, or integrated into a chip of the above-mentioned device. In addition, the determination module may be stored in the memory of the above-mentioned device in the form of program codes, and the function of the determination module may be called and executed by a processing element of the above-mentioned device so as to achieve the above functions. The other modules may be implemented in a similar manner. All or parts of the modules may be integrated together or arranged separately. Here, the processing element may be an IC having a signal processing capability. During the implementation, the steps of the method or the modules may be implemented through an integrated logic circuit of the processing element in the form of hardware or through instructions in the form of software.

For example, the above modules may be one or more ICs capable of implementing the above-mentioned method, e.g., one or more application specific integrated circuits (Application Specific Integrated Circuits, ASICs), one or more digital signal processors (Digital Signal Processors, DSPs), or one or more field programmable gate arrays (Field Programmable Gate Arrays, FPGAs). For another example, when a certain module is implemented by calling a program code through a processing element, the processing element may be a general-purpose processor, e.g., a central processing unit (Central Processing Unit, CPU) or another processor capable of calling the program code. These modules may be integrated together and implemented in the form of system-on-a-chip (System-On-a-Chip, SOC).

It should be appreciated that, units and algorithm steps described in the embodiments of the present disclosure may be implemented in the form of electronic hardware, or a combination of a computer software and the electronic hardware. Whether these functions are performed by hardware or software depends on the specific application and design constraint conditions of the technical solution. Professionals and technicians can use different methods for each specific application to implement the described functions, but such implementation should not be considered beyond the scope of the present disclosure.

A person skilled in the art can clearly understand that, for the convenience and conciseness of description, the specific working process of the above-described system, device, and unit can refer to the corresponding process in the foregoing method embodiments, which is not repeated herein.

In the embodiments provided in this application, it should be understood that the disclosed device and method may be implemented in other ways. For example, the device embodiments described above are only schematic. For example, the division of the unit is only a logical function division, and there may be other divisions in actual implementation, for example, multiple units or components may be combined or can be integrated into another system, or some features can be ignored, or not implemented. In addition, the displayed or discussed mutual coupling or direct coupling or communication connection may be indirect coupling or communication connection through some interfaces, devices or units, and may be in electrical, mechanical, or other forms.

The units may be, or may not be, physically separated from each other. The components displayed as units may or may not be physical units, that is, they may be located in one place, or may be distributed on multiple network units. Some or all of the units may be selected according to actual needs to achieve the purpose of the solution of this embodiment.

In addition, the functional units in the various embodiments of the present disclosure may be integrated into one processing unit, or each unit may exist alone physically, or two or more units may be integrated into one unit.

In the case that the functional units are implemented in a software form and sold or used as a separate product, they may be stored in a computer-readable medium. Based on this, the technical solution of the present disclosure essentially or part of the contribution to the related art or part of the technical solution can be embodied in the form of a software product, and the computer software product is stored in a storage medium and include several instructions so as to enable computer equipment (a personal computer, a server or network equipment) to execute all or parts of the steps of the method according to the embodiments of the present disclosure. The storage medium includes any medium capable of storing therein program codes, e.g., a Universal Serial Bus (USB) flash disk, a mobile Hard Disk (HD), an ROM, an RAM, a magnetic disk or an optical disk.

It should be further appreciated that, according to the device and the method in the embodiments of the present disclosure, the members and/or steps may be subdivided and/or recombined, which shall also be deemed as equivalents of the present disclosure. In addition, the steps for executing the above-mentioned processings may naturally be performed in a time sequence according to the order of description, but do not necessarily need to be performed in a time sequence, and some steps can be performed in parallel or independently of each other. It should be further appreciated that, after reading the descriptions of the present disclosure, it is able for a person skilled in the art who may understand that all or any of the steps or components of the method and device of the present disclosure, using a basic programming skill, to implement any or all steps of the method and any or all members of the device in any computing device (including a processor and a storage medium) or a network consisting of the computing devices, in the form of hardware, firmware, software or a combination thereof.

Therefore, the purpose of the present disclosure can also be realized by running a program or a group of programs on any computing device. The computing device may be a well-known general-purpose device. Therefore, the purpose of the present disclosure can also be achieved only by providing a program product including program code for implementing the method or device. That is, such a program product also constitutes the present disclosure, and a storage medium storing such a program product also constitutes the present disclosure. Obviously, the storage medium may be any well-known storage medium or any storage medium developed in the future. It should also be pointed out that, in the device and method of the present disclosure, obviously, each component or each step can be decomposed and/or recombined. These decomposition and/or recombination should be regarded as equivalent solutions of the present disclosure. In addition, the steps of executing the above-mentioned series of processing can naturally be executed in time sequence in the order of description, but it is not necessarily executed in time sequence. Certain steps can be performed in parallel or independently of each other.

The above are preferred embodiments of the present disclosure, and it should be noted that a person of ordinary skills in the art can make further improvements and modifications without departing from the principle of the present disclosure, and these improvements and modifications should also be considered to fall within the protection scope of the present disclosure.

What is claimed is:

1. A non-transitory computer-readable storage medium storing therein a computer program, wherein the computer program is used to be executed by a processor to implement steps of:
  determining, by a first wireless relay, that a first backhaul path currently used by a terminal is required to be switched, wherein at least the first backhaul path and a second backhaul path are pre-established for the terminal, each of the first backhaul path and the second backhaul path is between a network-side node and the terminal, the first wireless relay is a relay in the first backhaul path and the second backhaul path, and respective prior-hop relays or respective next-hop relays of the first wireless relay in the first backhaul path and the second backhaul path are different;
  switching a backhaul path currently used by the terminal from the first backhaul path to the second backhaul path.

2. The non-transitory computer-readable storage medium according to claim 1, wherein determining that the first backhaul path currently used by the terminal is required to be switched comprises:
  detecting, by the first wireless relay, radio link failure between the first wireless relay and a second wireless relay, wherein the second wireless relay is a prior-hop relay or a next-hop relay of the first wireless relay in the first backhaul path; or
  receiving, by the first wireless relay, a notification message transmitted by the network-side node, wherein the notification message notifies the first wireless relay to switch the backhaul path currently used by the terminal.

3. The non-transitory computer-readable storage medium according to claim 2, wherein the computer program is used to be executed by a processor to: subsequent to detecting, by the first wireless relay, the radio link failure between the first wireless relay and the second wireless relay,
  transmit, by the first wireless relay, indication information about the radio link failure to a neighbor relay.

4. The non-transitory computer-readable storage medium according to claim 2, wherein detecting, by the first wireless relay, the radio link failure between the first wireless relay and the second wireless relay comprises:
  detecting, by the first wireless relay, a radio signal of a pre-established neighbor relay, wherein the neighbor relay comprises the second wireless relay;
  determining whether a link between the first wireless relay and the second wireless relay fails according to a detection result of the radio signal of the second wireless relay.

5. The non-transitory computer-readable storage medium according to claim 1, wherein the computer program is used to be executed by a processor to: in the case that there are at least two second backhaul paths, prior to switching the backhaul path currently used by the terminal from the first backhaul path to the second backhaul path,
  select, according to a measurement result of signal quality of a wireless relay reported by the terminal, a second backhaul path having best signal quality from the at least two second backhaul paths as the second backhaul path serving as a switching target.

6. The non-transitory computer-readable storage medium according to claim 1, wherein the computer program is used to be executed by a processor to: prior to determining that the first backhaul path currently used by the terminal is required to be switched, establish a neighbor list of the first wireless relay in a following way, wherein the neighbor list comprises at least one neighbor relay of the first wireless relay:
  detecting a wireless relay around the first wireless relay by detecting a radio signal;
  transmitting information about the detected wireless relay to the network-side node, and receiving the neighbor list of the first wireless relay transmitted by the network-side node, or selecting a wireless relay whose signal quality meets a predetermined condition from detected wireless relays, to acquire the neighbor relay of the first wireless relay; and
  establishing an interface between the first wireless relay and the neighbor relay.

7. The non-transitory computer-readable storage medium according to claim 1, wherein the computer program is used to be executed by a processor to: prior to determining that the first backhaul path currently used by the terminal is required to be switched, establish, by the first wireless relay, the second backhaul path for the terminal in a following way:
  receiving, by the first wireless relay, measurement report information transmitted by the terminal, wherein the measurement report information comprises signal quality of a neighbor relay of a serving relay serving the terminal;
  establishing, by the first wireless relay, an interface from the first wireless relay to a first neighbor relay for the terminal according to the measurement report information, to form the second backhaul path between the network-side node and the terminal, wherein the first neighbor relay is a relay, whose signal quality meets a preset threshold, among neighbor relays of the serving relay.

8. A non-transitory computer-readable storage medium storing therein a computer program, wherein the computer program is used to be executed by a processor to implement steps of:
    determining, by a network-side node, that a first backhaul path currently used by a terminal is required to be switched, wherein at least the first backhaul path and a second backhaul path are pre-established for the terminal, a first wireless relay is a relay in the first backhaul path and the second backhaul path, and respective prior-hop relays or respective next-hop relays of the first wireless relay in the first backhaul path and the second backhaul path are different;
    transmitting, by the network-side node, a notification message to the first wireless relay, wherein the notification message notifies the first wireless relay to switch the backhaul path currently used by the terminal.

9. The non-transitory computer-readable storage medium according to claim 8, wherein determining that the first backhaul path currently used by the terminal is required to be switched comprises:
    receiving, by the network-side node, a report message about radio link failure reported by the first wireless relay, wherein the report message indicates radio link failure between the first wireless relay and a second wireless relay, the second wireless relay is a prior-hop relay or a next-hop relay of the first wireless relay in the first backhaul path.

10. The non-transitory computer-readable storage medium according to claim 8, wherein in the case that there are at least two backhaul paths, transmitting the notification message to the first wireless relay comprises:
    receiving, by the network-side node, a measurement result of signal quality of a wireless relay from the terminal, selecting a second backhaul path, where a next-hop relay having best signal quality is located, from the at least two second backhaul paths as the second backhaul path serving as a switching target;
    transmitting the notification message to the first wireless relay, wherein the notification message is further used to indicate the second backhaul path serving as the switching target.

11. The non-transitory computer-readable storage medium according to claim 8, wherein the computer program is used to be executed by a processor to: prior to determining that the first backhaul path currently used by the terminal is required to be switched, establish, by the network side node, the second backhaul path for the terminal in a following way:
    receiving, by the network-side node, measurement report information from the terminal, wherein the measurement report information comprises signal quality of a neighbor relay of a serving relay serving the terminal;
    establishing, by the network-side node, at least one of following interfaces for the terminal according to the measurement report information to form the second backhaul path between the network-side node and the terminal: an interface from the network-side node to the first wireless relay, an interface from the network-side node to a first neighbor relay, and an interface from the network-side node to the first neighbor relay via a prior-hop relay,
    wherein the first neighbor relay is a relay, whose signal quality meets a preset threshold, among neighbor relays of the serving relay serving the terminal.

12. The non-transitory computer-readable storage medium according to claim 11, wherein the computer program is used to be executed by a processor to: prior to receiving the measurement result of the signal quality of the wireless relay from the terminal,
    transmit, by the network-side node, measurement configuration information to the terminal, wherein the measurement configuration information comprises information about a neighbor relay of the first wireless relay.

13. A first wireless relay, comprising a processor, a memory, and a computer program stored in the memory and capable of being executed by the processor, wherein the first wireless relay is a Serving Integrated Access and Backhaul (SIAB) serving a terminal, or a Next Integrated Access and Backhaul (NIAB) for the SIAB, wherein the processor is used to execute the computer program to implement steps of:
    determining that a first backhaul path currently used by the terminal is required to be switched, wherein at least the first backhaul path and a second backhaul path are pre-established for the terminal, each of the first backhaul path and the second backhaul path is between a network-side node and the terminal, the first wireless relay is a relay in the first backhaul path and the second backhaul path, and respective prior-hop relays or respective next-hop relays of the first wireless relay in the first backhaul path and the second backhaul path are different;
    switching a backhaul path currently used by the terminal from the first backhaul path to the second backhaul path.

14. The first wireless relay according to claim 13, wherein determining that the first backhaul path currently used by the terminal is required to be switched comprises:
    detecting radio link failure between the first wireless relay and a second wireless relay, wherein the second wireless relay is a prior-hop relay or a next-hop relay of the first wireless relay in the first backhaul path; or
    receiving a notification message transmitted by the network-side node, wherein the notification message notifies the first wireless relay to switch the backhaul path currently used by the terminal.

15. The first wireless relay according to claim 14, wherein the processor is used to execute the computer program to: subsequent to detecting the radio link failure between the first wireless relay and the second wireless relay,
    transmit indication information about the radio link failure to a neighbor relay.

16. The first wireless relay according to claim 14, wherein detecting the radio link failure between the first wireless relay and the second wireless relay comprises:
    detecting a radio signal of a pre-established neighbor relay, wherein the neighbor relay comprises the second wireless relay;
    determining whether a link between the first wireless relay and the second wireless relay fails according to a detection result of the radio signal of the second wireless relay.

17. The first wireless relay according to claim 13, wherein the processor is used to execute the computer program to: in the case that there are at least two second backhaul paths, prior to switching the backhaul path currently used by the terminal from the first backhaul path to the second backhaul path,
    select, according to a measurement result of signal quality of a wireless relay reported by the terminal, a second backhaul path having best signal quality from the at least two second backhaul paths as the second backhaul path serving as a switching target.

18. The first wireless relay according to claim 13, wherein the processor is used to execute the computer program to: prior to determining that the first backhaul path currently used by the terminal is required to be switched, establish a neighbor list of the first wireless relay in a following way, wherein the neighbor list comprises at least one neighbor relay of the first wireless relay:
    detecting a wireless relay around the first wireless relay by detecting a radio signal;
    transmitting information about the detected wireless relay to the network-side node, and receiving the neighbor list of the first wireless relay transmitted by the network-side node, or selecting a wireless relay whose signal quality meets a predetermined condition from detected wireless relays, to acquire the neighbor relay of the first wireless relay; and
    establishing an interface between the first wireless relay and the neighbor relay.

19. The first wireless relay according to claim 13, wherein the processor is used to execute the computer program to: prior to determining that the first backhaul path currently used by the terminal is required to be switched, establish the second backhaul path for the terminal in a following way:
    receiving measurement report information transmitted by the terminal, wherein the measurement report information comprises signal quality of a neighbor relay of a serving relay serving the terminal;
    establishing an interface from the first wireless relay to a first neighbor relay for the terminal according to the measurement report information, to form the second backhaul path between the network-side node and the terminal, wherein the first neighbor relay is a relay, whose signal quality meets a preset threshold, among neighbor relays of the serving relay.

\* \* \* \* \*